Sept. 29, 1959 H. W. TREVASKIS 2,906,314
PNEUMATIC TIRES
Filed March 1, 1955 5 Sheets-Sheet 1
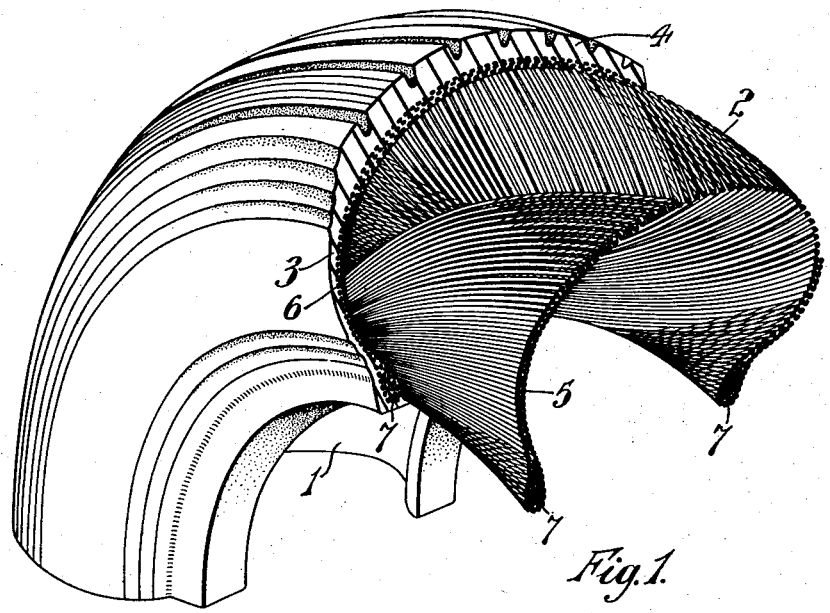
Fig. 1.
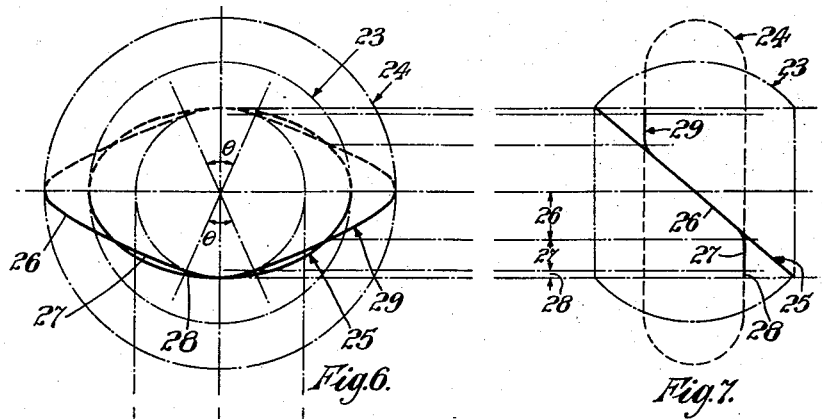
Fig. 6.  Fig. 7.
Fig. 8.
INVENTOR
Henry William Trevaskis
by Benj. T. Rauber
his attorney

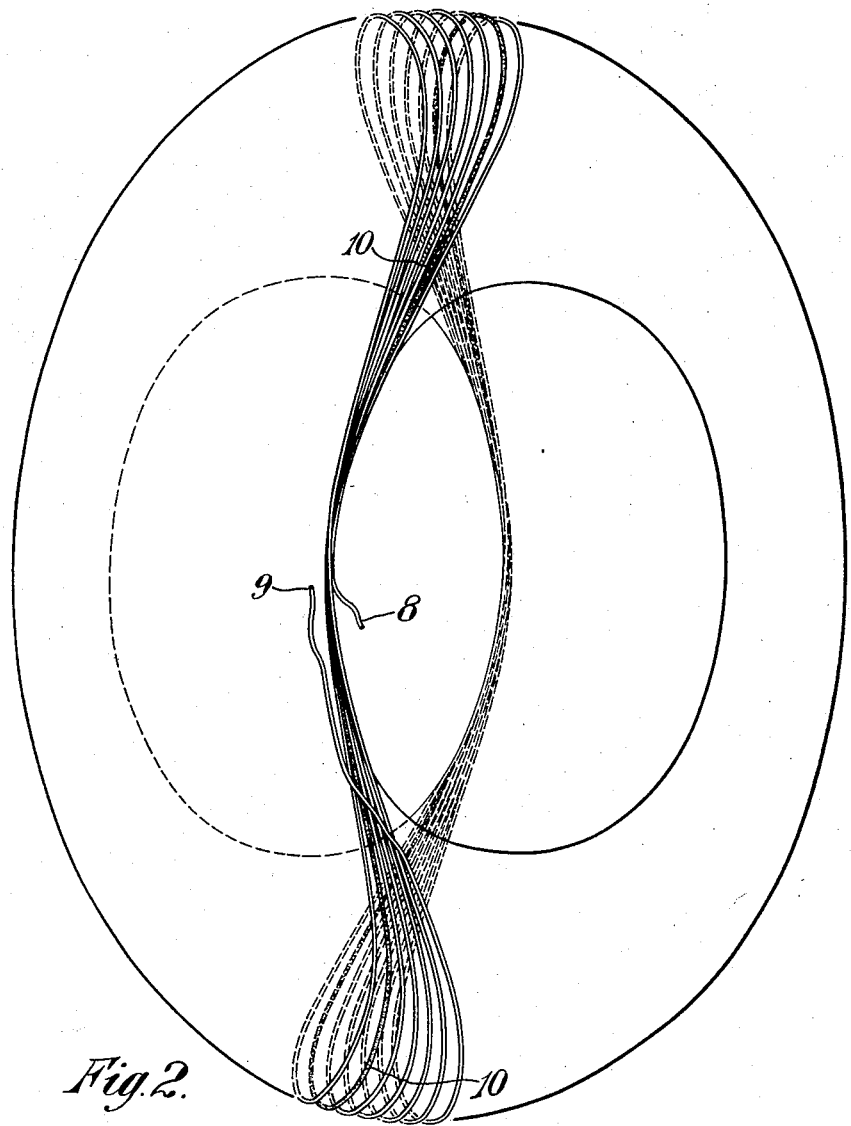

Sept. 29, 1959     H. W. TREVASKIS     2,906,314
PNEUMATIC TIRES

Filed March 1, 1955     5 Sheets-Sheet 3

INVENTOR
Henry William Trevaskis
by Benj. T. Rauber
his attorney

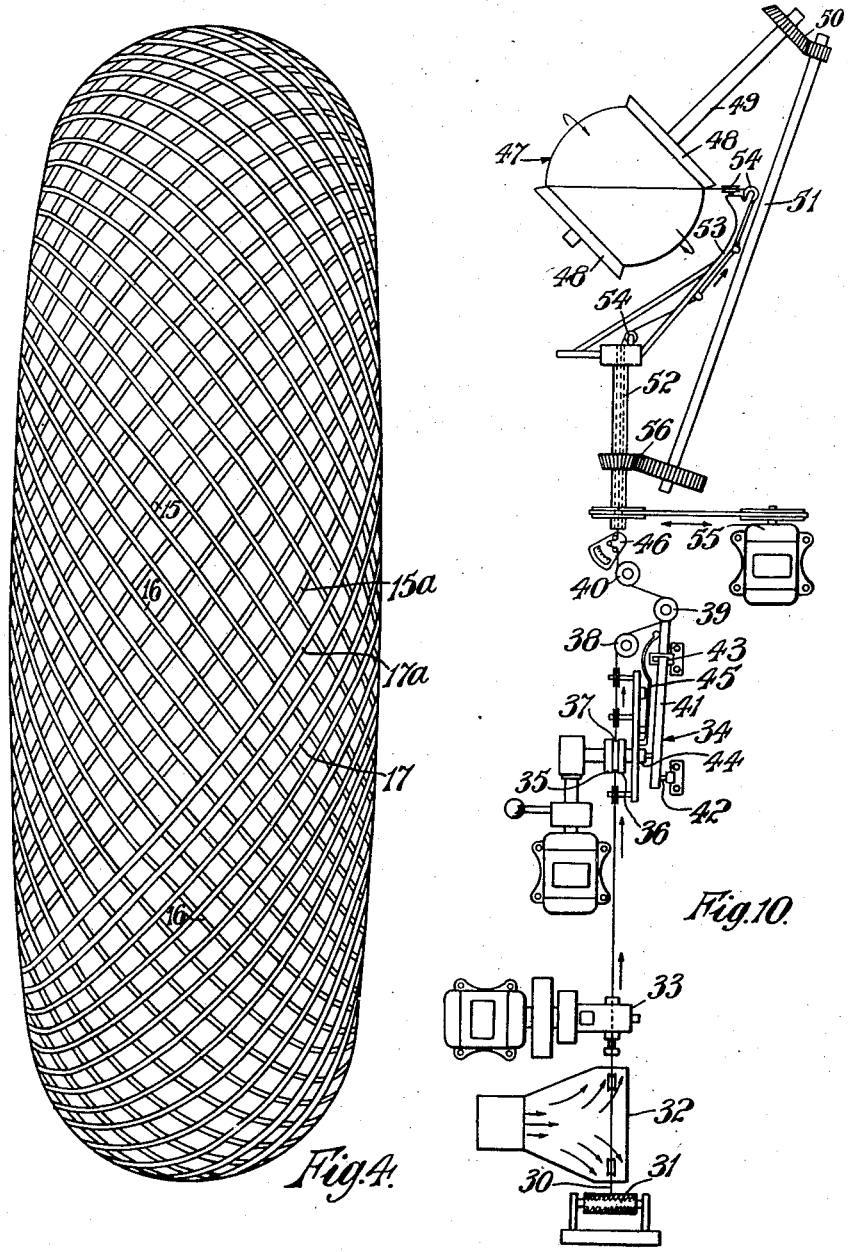

Sept. 29, 1959 H. W. TREVASKIS 2,906,314
PNEUMATIC TIRES
Filed March 1, 1955 5 Sheets-Sheet 5

INVENTOR
Henry William Trevaskis
by Benj. T. Rauber
his attorney

United States Patent Office 2,906,314
Patented Sept. 29, 1959

2,906,314

PNEUMATIC TIRES

Henry William Trevaskis, Solihull, England, assignor, by mesne assignments, to Dunlop Tire and Rubber Corporation, Buffalo, N.Y., a corporation of New York Application March 1, 1955, Serial No. 491,295

Claims priority, application Great Britain March 2, 1954

19 Claims. (Cl. 152—356)

This invention relates to pneumatic tires and to a method and apparatus for their production.

Pneumatic tires are customarily built on a collapsible cylindrical building drum from plies of fabric cut on the bias from a length of rubberized tire cord fabric. Several plies are wrapped around the drum in a manner such that the cords in adjacent plies are disposed in opposite directions, each of the plies overlapping each end of the drum.

A preformed endless bead wire is slipped over the overlapping portion of the plies at each end face and the plies are turned up and wrapped around the bead wires to enclose them securely. An extruded strip of rubber to form the tread and sidewalls is then wrapped around the drum, the drum is collapsed and the cylindrical cover removed therefrom. An annular airbag is then located within the cover and lightly inflated to shape the cylindrical cover into one of customary toroidal cross-section, the cover and airbag are inserted within a mould and, after fully inflating the airbag, the cover is moulded under heat and pressure.

My present invention provides tires containing a reinforcement constructed from a winding of cord in which the usual bead wires are dispensed with and which will automatically grip an associated rim on inflation. This is the reverse of the effect obtained with existing commercially-available tires, which contain bead wires and which tend to be blown off the rim by the inflation pressure.

According to my invention a pneumatic tire comprises a body of natural rubber or other suitable resilient material containing, as an internal reinforcement, a winding of cord arranged in the form of at least one double layer in which the cord of one layer crosses over the cord of the other layer to form a lattice and the cord in each layer extends in a series of coils progressing continuously around the tire in the same direction, each coil consisting of two substantially diagonally opposite arcuate portions, each extending through one bead of the tire, alternating with open loop portions passing through the side walls and crown of the tire which merge substantially tangentially with the arcuate portions and take a path which is substantially a geodesic with respect to the surface defined by the layer, the arcuate portions of cord in the coils being sufficiently long to ensure that, on inflation of the tire, the beads thereof will tend to contract in diameter as a result of the tension imposed on the cord.

The arcuate portion of cord subtends at the axis of the tire an angle which is referred to in this specification as the "bead lap angle."

In practice it is usually most convenient to wind the whole of the reinforcement from a single length of cord, though it is possible to use more than one long length if so desired. For instance, each double layer can be wound from a separate length of cord.

The tendency of the beads of the tire to contract in diameter on inflation will cause the tire to grip a wheel rim on which it is mounted. This is the most important characteristic of tires in accordance with the invention, as it makes it possible to dispense with bead wires and has other advantages which are referred to below. This tendency is due to the configuration of the coils of cord, each of which, as stated above, consists of an arcuate portion in one bead of the tire merging into an open loop portion running through the walls and crown of the tire merging back into the opposite arcuate portion in the outer bead thence into an open loop portion running back toward the first bead and merging continuously with a further arcuate portion immediately adjacent the previous corresponding arcuate portion and so on. The open loop portions follow a path which is substantially the shortest possible, i.e. which is substantially a geodesic, with respect to the surface defined by the layer in which they lie, and the arcuate and loop curved portions form a smooth three dimensional curve.

The construction of tires in accordance with the invention resulting in the inwardly directed force exerted by the edges on inflation makes the usual bead wires unnecessary. For convenience however the edges are sometimes referred to as beads in this specification.

The cord may be made of steel or of a suitable natural or artificial textile material, e.g. cotton, rayon, nylon or the polyester made from terephthalic acid and ethylene glycol and sold under the registered trademark "Terylene" and preferably consists of a number of twisted strands, each of which consists of a number of twisted filaments.

The resilient material may be natural rubber or a synthetic rubber, for example a butadiene-styrene copolymer or the copolymer of isobutylene with a small proportion of butadiene known as Butyl rubber.

The invention also comprises a method of making a pneumatic tire which comprises winding sheathed cord progressively around a former having thereon a winding surface of substantially part-spherical shape to form a reinforcement having edges of equal diameter and constituted by at least one double layer of cord, the cord of one layer lying upon and crossing over the cord of the other layer to form a lattice and each layer consisting of a continuous series of turns which are spaced equidistantly around the former, extend obliquely around it in a geodesic path and make tangential contact with opposite edges of the reinforcement at positions substantially diagonally opposite, removing the reinforcement from the former and thereafter heating and molding it together with a vulcanizable composition containing natural rubber or other suitable resilient material to vulcanize the composition and form the tire, the molding operation displacing the edges of the reinforcement axially inwardly, expanding the crown portion of the reinforcement and deforming the cord so that portions thereof extend arcuately in the beads of the tire to an extent sufficient to cause said beads to tend to contract in diameter when the tire is inflated.

An important advantage of tires in accordance with the invention is that the building of the reinforcement can be carried out semi-automatically by means of a machine which lays the cord on a former in the required path by the appropriate relative motions of the former and the cord feed. In such a machine both the former and the feed may move or one may be stationary and the other move. The process of tire building may thus be largely mechanized.

Thus the invention also includes apparatus for the manufacture of a pneumatic tire which comprises a former having a side surface of substantially part-spherical shape and having two parallel flat end surfaces of equal diameter, means for feeding cord on to the former and means for effecting relative movement between the former and the feeding means to lay the cord on the side surface of the former, hereinafter called the winding surface in a series of coils progressing around the former in the same direction, each coil extending obliquely around the former in a geodesic path and making tangential contact with each edge of the winding surface at substantially diametrically opposite points.

The former is preferably a sphere or spheroid truncated at opposite ends of a diameter to provide circular end faces of equal area, said end faces having cylindrical or frusto-conical portions extending axially therefrom to prevent the turns of cord from falling off the edges of the former proper. With a former of this shape the cord is wound in a series of coils in such a manner that, from a point of origin on the boundary of one of the end faces, it leaves the edge tangentially and follows a curved path which is a geodesic over the curved outer surface of the former to a second point, substantially diagonally opposed and on the boundary of the other end face. The cord touches this other face tangentially and continues in a curved path, which is a geodesic over the curved outer surface of the former, back to make tangential contact with the first face thereof at a location adjacent the point of origin.

The cord may be laid in this manner by rotating the former slowly about an axis of symmetry and simultaneously traversing the cord in a geodesic path inclined to the axis at such an angle that the cord makes tangential contact with the circular edges of the end faces of the former. By adjustment of the relative rates of rotation of the former and traverse of the cord it can be arranged that each turn is displaced circumferentially relative to the preceding turn to the extent required.

The cord is preferably sheathed with a rubber-covering, e.g. it may be sprayed or dipped in rubber solution or coated with a rubber composition containing a vulcanizing agent and accelerator such as is customarily used for the production of tire cord fabric, and is preferably wound on to a layer of rubber secured to the former. A reinforcement comprising one or more double layers of cord may be provided.

When the reinforcement has been built up a layer of rubber may be applied to the outer cord layer and the tire may then be completed in the usual manner by the application of a tread strip and chafer strips, followed by removal from the former, insertion of an airbag and shaping and vulcanizing in a mold.

In the method of winding the cord onto the former, as hereinabove described, the cord merely touches the edges of the circular end faces of the former tangentially at substantially diagonally-opposed locations at opposite edges of the former. However, after stripping the assembly from the former the beads are forced axially towards one another and the crown is forced radially outwardly. During molding the length of cord in each geodesic, which was hitherto substantially in the shape of a circular arc, is deformed into somewhat elliptical shape and during the molding process the portions of the cord at the edges of the reinforcement are re-positioned so that in a cured and molded tire they extend arcuately through the beads and constitute the bead reinforcements.

The spacing between adjacent turns, the strength of the cord and the number of double layers may vary and will be chosen in accordance with the strength required in the tire.

The apparatus in one specific embodiment comprises a substantially part-spherical collapsible former in the shape of a sphere equally truncated at opposite ends of a diameter and provided at said ends with frusto-conical portions to retain the edges of the reinforcement. The former is mounted on a spindle passing centrally through its truncated ends and an arm is provided, mounted on a shaft and so angled that the end thereof in one angular position of the shaft is located adjacent the edges of one truncated portion of the former and for a 180° revolution of the shaft said end moves around to a location adjacent the edge of the other portion. The end of the arm lays the cord in substantially circular coils around the former and from one edge to the other and at the same time the former is slowly rotated to form a latticed envelope of cord on the former. The arm can be very light and can be made to move very rapidly around the former so that the envelope is quickly laid.

In order that the invention may be more fully described, reference is made to the accompanying drawings, which relate to a tire reinforcement constructed by winding on a frusto-spherical former and to a preferred apparatus for constructing such a reinforcement and of which:

Figure 1 is a fragmentary, part-sectioned, perspective view of a tire containing a reinforcement constructed in accordance with the present invention, the side wall, tread, two outer plies, and part of the cords next to the inner ply being cut away to show the lay of the plies;

Figure 2 is a perspective view of a similar tire which illustrates the unit waves formed by the cord in a molded tire, only a few of the coils being shown and those being widely spaced apart for the sake of clarity;

Figure 4 is another view of the reinforcement shown in Figure 3;

Figures 6, 7 and 8 are three related diagrammatic views of a single turn in an unmolded reinforcement, i.e. on a former, and of the corresponding coil in a tire after it has been molded;

Figure 10 is a diagrammatic view of apparatus for constructing a reinforcement according to the present invention.

Figure 3:
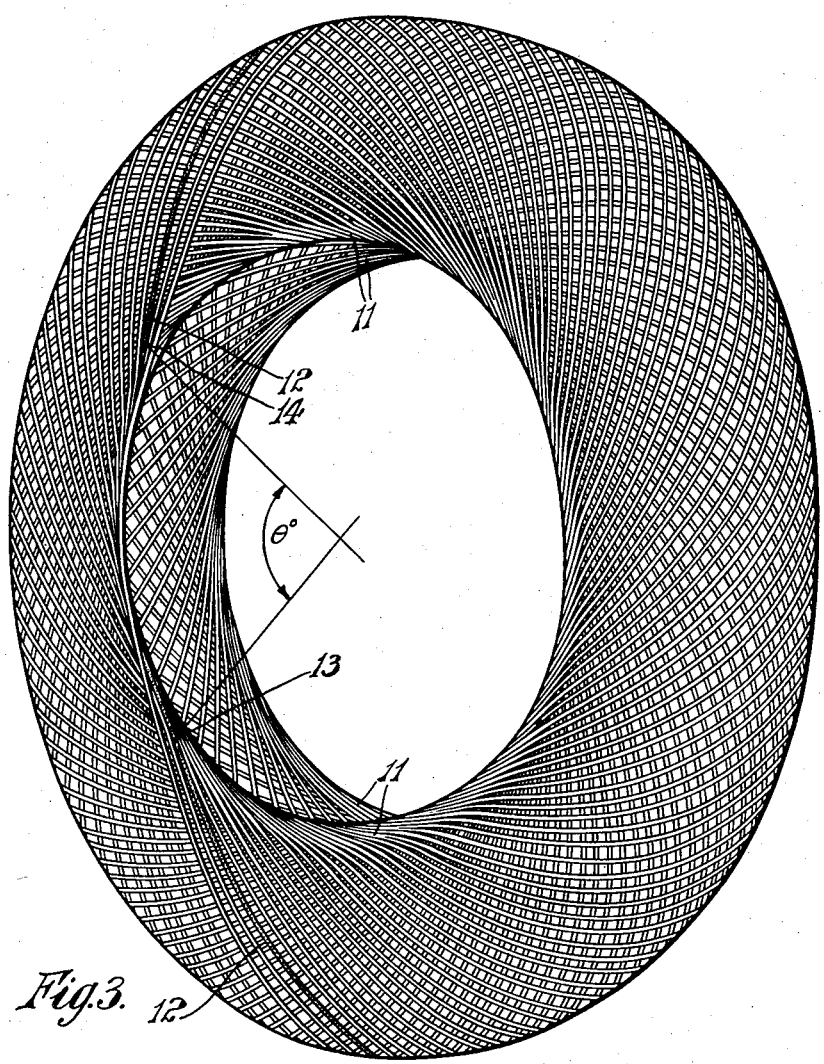
Figure 3 is a perspective skeletal view of the reinforcement of a molded tire, the coils of cord being spaced widely apart for the sake of clarity.
Figures 5A, 5D:
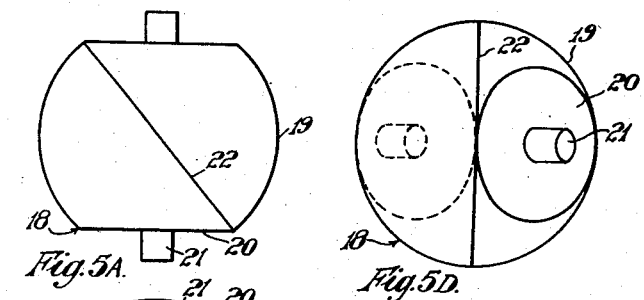
Figures 5A to 5E are related views of a former having a single turn of cord wound thereon.
Figures 5B, 5E:
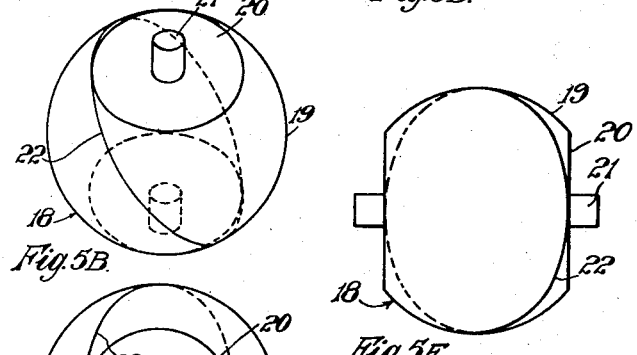
Figure 5C:
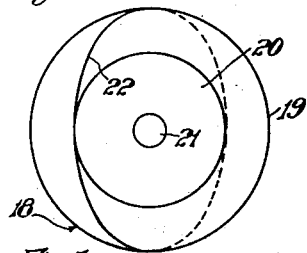

The tire and the method and apparatus for making the tire hereinafter described with reference to the accompanying drawings relate to a preferred embodiment of the invention wherein the reinforcement is constructed by winding on a frusto-spherical former.

The tire shown in Figure 1 comprises an inner layer of rubber 1, a rayon cord reinforcement 2 and an outer layer of rubber 3 which is provided with a tread 4. The rayon cord reinforcement comprises two double layers 5 and 6 of rubberized rayon cord, the portions of cord of each single layer crossing the portions of cord of an adjacent layer over the crown and side walls of the tire to form a close lattice. The portions of cord extending in arcs in the vicinity of the edges of the tire together form the beads 7. The coils in each layer of cord each extend continuously around the tire and from one bead to the other and approach and leave the arcuate portion in each bead substantially tangentially and trace a path across the crown and side walls of the tire between successive points at which the cord parts from one bead and meets the other bead which is substantially a geodesic with respect to a surface defined by the layer. Each coil of cord comprises an arc extending through one bead, a geodesic extending across the crown and sidewalls, an arc extending through the other bead and another geodesic extending back across the crown and side walls to the original bead.

The construction of the cord reinforcement is more fully shown in Figure 2. One length of cord only is employed, the portion shown in the figure starting at 8 and finishing at 9. One complete coil is shown shaded at 10 to illustrate more fully the configuration thereof in a completed and molded tire.

The perspective view of the tire reinforcement shown in Figure 3 illustrates how the bead 11 is built up. A portion of cord, shown shaded at 12, extending across the crown and side walls of the tire, meets the bead substantially tangentially at 13 and extends in an arc through said bead to a location at 14 whence it leaves the bead substantially tangentially to return across the crown and side walls to the other bead. The arcuate portion of cord from 13 to 14 subtends at the center of the tire an angle $\theta$, herein termed the bead lap angle. The cord enters the bead at 13 and leaves it at 14 in directions substantially tangential to the arcuate portion from 13 to 14.

The view of the tire reinforcement shown in Figure 4 illustrates the configuration of the portions of cord in the crown and shoulders of the tire. The double layer of cord 15 and 16, or 16 and 17, extends over the crown in lattice formation, as illustrated, the cords 16 overlying the cords 15 over one half of the tire, i.e. as far as cord 15a, where they dip below cords 17 at 17a to form the under layer over the other half of the tire. It will be understood that on the other side of the tire the cords 16 similarly change from under layer to upper layer. Each layer of the double layer is generated simultaneously, and the double layer develops at diagonally opposed regions, starting at the beads, as each winding crosses corresponding parts of previously-laid windings with opposite bias.

The angles of intersection of the cords of the lattice in the circumferential direction increase from zero at each edge to a maximum at the crown. The cord density per unit area of former increases from the crown to the edges of the reinforcement. As will be seen there is no interweaving of the cords in the two layers and any tendency of a cord to chafe at points of crossing is therefore reduced to a minimum.

A method of manufacturing a tire constructed in accordance with the invention will now be described. A collapsible former, of part-spherical shape, i.e. equally truncated at opposite ends of a diameter, is rotatable about an axis passing centrally through the truncated ends. This former is covered with a sheet of uncured rubber which constitutes the inside of the complete tire, and this sheet forms a tacky surface to which the cord will readily adhere.

Rayon cord is led from a bobbin, through a nozzle which applies a coating of a vulcanizable rubber composition and through a tensioning device and is then fed on to the former as it rotates slowly by means of a winding arm which is rotatable about an axis intersecting the rotational axis of the former and inclined thereto at the required angle. The arrangement is such that in one complete rotation of the end of the arm around the former, the cord would, if the former were stationary, extend in a circle from a point at one edge of the former geodesically across to a diagonally opposed point at the other edge and then back again to the original point, touching both points tangentially.

This is illustrated in the accompanying diagrammatic Figures 5A to 5E which show five related views of a former 18 having a part-spherical outer periphery 19 and circular flat portions 20 at opposite ends of a diameter. The spigots 21 indicate its axis of rotation. A turn of cord 22 is shown extending geodesically around the former from one edge to the other, meeting and leaving said edges tangentially.

On account of the slow rotation of the former the cord is not laid in a truly circular path as shown but in one which deviates from such a path by an amount depending on the relative rates of rotation of the arm and the former, so that the points of contact of the cord with each edge of the former advance or retreat progressively as the winding continues until, when the former has made approximately one rotation, an envelope comprising a double layer of cord has been formed.

As the cord reinforcement is built up on the former the thickness thereof increases from the crown to the edges, and if desired the configuration of the former may be slightly more convex than spherical so that, when the reinforcement is finally built up, a surface lying between the inner and outer peripheries of the reinforcement is truly part-spherical. Two double layers of rayon cord are provided in all and a layer of sheet rubber may be applied between the double layers of cord. A breaker strip or strips may then be fitted to reinforce the crown of the casing and an outer layer of rubber and a tread strip is fitted. Chafing strips may also be added.

The unmolded tire so formed is removed from the former by collapsing the former. The tire at this stage follows the configuration of the former and each turn of cord is substantially circular. During molding the edges are moved axially-inwardly to form the beads and at the same time the crown of the tire is forced radially outwardly to give a conventional tire section.

This is illustrated diagrammatically in Figures 6, 7 and 8 which show three related views of a single turn of cord as it extends on a former, and also of the corresponding unit wave as it extends in a tire after it has been shaped and cured in a mold. Reference number 23 indicates the former and 24 indicates the molded tire. On the former the cord 25 of each turn leaves a location at one edge tangentially, extends geodesically across the former to a substantially diametrically-opposed location at the other edge, arriving at and departing from said location tangentially, and extends geodesically back across the former to arrive tangentially at a location at the first edge adjacent said first location.

When the reinforcement is completely wound and the tread strip and other elements are assembled the tire is removed from the former, placed in a mold, inflated by means of an airbag and molded. The edges of the tire are moved axially inwardly, as best shown in Figure 7, and the crown of the tire is moved outwardly. The portions of cord forming each geodesic, hitherto in the shape of a semi-circle, are displaced into substantially semi-elliptical shape, the loop 26 of each part-ellipse extending over the crown of the molded tire, the intermediate portions 27 extending down the sidewalls to the beads and the end portions 28 being moved axially inwardly during the molding process so that, in the molded tire, they extend in diagonally-opposite arcs in the beads. Thus in a molded tire each coil is illustrated at 29. This movement of the cords takes place on molding.

The arcs of cord which each extend adjacent the edges of the tire together form the bead reinforcement which grips the rim when the tire is inflated. Each arc subtends at the center of the cover a bead lap angle which, for any particular shape of tire, should exceed a theoretical minimum value dependent on the maximum working elongation characteristics of the cord employed. This feature will be more fully explained later in the specification but it may here be noted that for most sizes of tire for motor road vehicles or aircraft the theoretical minimum bead lap angle, which is calculated for a single coil of cord only and without taking into consideration the displacement of the cord in practice from the theoretical position, is of the order of 25° for rayon cord and about 5° for steel cord.

Figure 9:
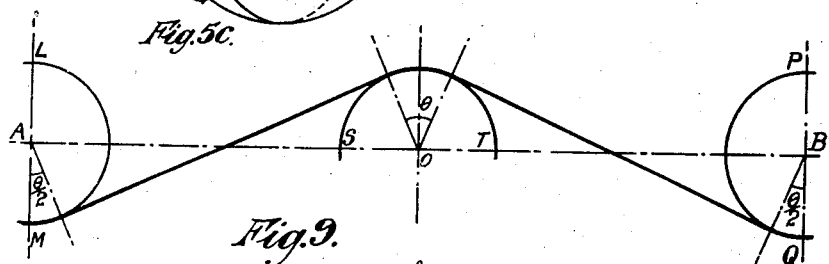
Figure 9 illustrates, in developed form, the length and configuration of one unit wave of cord around a tire of given dimensions.

One coil of a molded tire may be developed as illustrated in Figure 9. A straight line AB is laid out which is equal to twice the distance around the cross-section of the reinforcement in the molded tire plus twice the bead diameter. Arcs LM and PQ of the same diameter as the diameter across the beads of the tire are struck with centers at A and B. Another arc ST of the same diameter is struck with its center at O, the point midway between A and B. A line is drawn connecting arc LM at one side of line AB tangentially with arc ST at the other side of line AB and another line is drawn connecting arc ST at the same side of line AB tangentially with arc PQ at the original side of line AB. The resulting composite line MQ gives a close approximation to the theoretical length and developed configuration of a single coil of cord around the molded tire and the theoretical bead lap angle $\theta$ is clearly shown. It will be seen that the bead lap angle increases with increase in the bead diameter, if the circumferential length remains constant.

Figure 9 illustrates the theoretical bead lap angle obtained with a single coil in respect of one type of car tire. In practice, the effects of friction and rubber adhesion between the layers of cord during molding of the tire cause a slight displacement of the portions of the cord extending between the beads from the truly geodesic path and, due to the crowding of the cords at the beads, the arcuate portions of cord in the beads assume a path of varying radius which is circular with respect to the center of the tire over a relatively small angle only. Nevertheless, due to the close packing of the cords and bonding material in the beads, these arcuate portions of cord have a substantially large effective bead lap angle to produce the required grip on the wheel rim.

For any given tire dimensions, the dimensions of a former on which it may be constructed may be readily computed. In the case of a sphere truncated at opposite ends of a diameter, the diameter of the sphere is equal to the length of line MQ (taken from Figure 9) divided by $\pi$. The truncated portions of the sphere have a diameter substantially equal to the diameter of the tire bead although, in practice, a small percentage is added to this to compensate for relaxation of the cord, which is wound under tension, on removal of the reinforcement from the former.

An apparatus for making a tire in accordance with the invention is shown diagrammatically in Figure 10. A rayon cord 30 is led from a rotatable spool 31 and through a drying chamber 32, which comprises a fan blowing air through an electrically-heated element and thence onto the cord as it continually passes through said chamber. The heat from the drying chamber dries out moisture from the cord and also preheats it for the next operation in which the cord passes through an extruder unit 33 where a thin sheath of rubber is continuously extruded around the cord.

The extruder unit 33 comprises a chamber into which an unvulcanized rubber composition is continuously fed by means of a driven screw conveyor. The cord passes into the chamber through a nipple at one side and the rubber is extruded around the cord as it emerges from an extruder nipple at the other side, said extruder nipple being dimensioned to allow a thin coating only of rubber on the cord, and being also electrically heated to better ensure even distribution of rubber on the cord.

From the extruder unit 33 the cord passes through a clutch mechanism, indicated generally at 34, which controls the tension in the cord.

In order to ensure that the completed tire is symmetrical and free from bulges and also to ensure that the correct bead diameter of the molded tire is attained it is necessary, for any particular type of cord, that a predetermined winding tension is accurately maintained. Thus for rayon cord a steady winding tension of the order of 1 lb. is desirable. However a greater tension, of the order of 3 lbs., is necessary to pull the cord through the extruder unit, and this tension may vary due, e.g. to the degree of plasticity of the rubber.

The clutch mechanism comprises a clutch plate 35 rotatable at a constant and controlled speed, a co-axial floating clutch plate 36 which is also driven and a freely rotatable drum 37 grooved to accommodate the rubber-covered cord. The cord passes over a pulley and around the under part of said drum 37 and under another pair of pulleys. From said pulleys it passes around three pulleys 38, 39 and 40 having their axes parallel and normal to the axes of the previously-mentioned pulleys, the two outer pulleys 38 and 40 being positioned to maintain the general line of direction of the cord whilst the intermediate pulley 39 is offset a short distance, e.g. 3 inches, from the said general line and on the side thereof containing the floating clutch plate 36. Said intermediate pulley is rotatably mounted on one end of a lever arm 41, the other end of which is pivotable about a fixed point 42 and said arm is supported in a bracket 43 to permit movement thereof in a plane containing said pulleys. Adjacent said fixed point 42 and on the side thereof adjacent the floating clutch plate 36 is a member which connects the lever arm with a thrust race 44 which is associated with the floating clutch plate 36. A leaf-spring 45, having one end rigidly secured, reacts against the lever arm to tend to move it angularly about its fixed point 42 and away from pulleys 38 and 40.

The rubber-coated cord passes under and over and around these various pulleys and drum, the operation of the clutch mechanism being as follows.

The desired tension in the cord between the clutch and the winding machine is imparted by the spring-loaded arm and with a tension of an order of 1 lb., the clutch is in constant operation, hunting on and off so rapidly that it draws the cord through the extruder with a force such that the desired tension of 1 lb. only is left in the cord between the clutch and the winding machine. If the friction or drag in the extruder increases, the tension in the cord on the winding machine side of the clutch tends to increase and this moves the lever arm against the spring to so operate the clutch mechanism that it exerts a greater force to draw the cord through the extruder, thus allowing the winding tension to revert to 1 lb. Similarly, if the force to draw the cord through the extruder decreases so that the winding tension drops substantially below 1 lb. then the lever arm is moved in the other direction by the spring so that the clutch exerts a lesser drawing force.

From the roller 40 of the clutch mechanism the rubber-coated cord passes through a tension meter 46 and thence to the winding apparatus. Said apparatus comprises a former 47 in the form of a sphere truncated at opposite ends of a diameter to form two equisized circular end faces and having frusto-conical portions 48 extending axially therefrom. The former is collapsible and detachably mounted on a spindle 49 fitted centrally through said frusto-conical portions. One end of this spindle is mounted in bearings and this end of the spindle is driven, through reduction gearing 50, by a shaft 51. A housing (not illustrated for the sake of clarity) is located adjacent the former and a hollow shaft 52 is mounted in bearings therein, the axis of said hollow shaft intersecting the rotational axis of the former and being inclined thereto at an angle of the order of 45°. The axis of the hollow shaft is axially-aligned with the center of the part-spherical former.

An arm 53 is secured to the end of the hollow shaft adjacent the former, said arm being angled as illustrated so that the end thereof in one angular position of the shaft is located adjacent one edge of the truncated sphere and for a 180° revolution of the shaft the said end moves round to a location adjacent the opposite edge diametrically opposite the first location. The arm is provided with rollers 54 to guide the rubber-coated cord which is led from the tension meter 46 and through the hollow shaft on to the surface of the truncated sphere. A counter weight (not illustrated) may be provided on an extension of said arm 53.

A motor 55 drives the hollow shaft to rotate the arm, and the hollow shaft 52 drives the shaft 51 by means of gearing 56. The gearing is such that for every revolution of the hollow shaft and arm the former rotates a fraction of a revolution only corresponding with the required pitch of the turns of cord.

It will be noted that as the arm 53 rotates about the spherical former surface it draws and winds the cord onto the former surface 47 in a circular path which is tangent to the circular truncated ends of this surface.

In a succeeding turn of the arm the cord will be advanced slightly on the former lying at the advancing side of the previous coil then crossing the previously formed cord and coming on the opposite side of the previously laid coil. The overlapping parts of the cord of successive coils will be built up in a plane of rotation of the last of the feeding rollers 54, that is, in a plane normal to the surface of the former at its edges. The cord being sheathed in a plastic sheathing of unvulcanized composition will tend to stay in place and the tension applied to the cord will tend to form the sheathing rubber into a unitary matrix. Instead of all of the cord turns lying in the plane of rotation of the last feeding roller 54, some turns may build up immediately adjacent thereto. In any event each cord will lie closely adjacent the plane of rotation of the last of the rollers 54 and thus form thickened beads tangent to these planes of winding. When the finished structure is removed from the former and molded to the shape of a tire, as shown in Fig. 1, with the side walls standing approximately normal to the axis of the tire, those parts of the cords which were in the plane of winding, that is the plane in which the final roller 54 revolves about the former will form an inner periphery of the bead of approximately cylindrical form, or deviating slightly therefrom, and in which any tension on each cord will give a radially inward component acting directly on the wheel rim or on a layer of cord immediately upon the wheel rim. It will be apparent that inflation pressure acting radially outwardly on the tread portion must of necessity cause a cord tension which will give a radially inward component at the bead for each cord will tend to contract the diameter of the bead and seat it the more firmly on the wheel rim the greater the pressure of inflation. Each cord is effective for this inwardly acting component at the bead inasmuch as each cord passes through the bead in direct contact with the wheel rim or in a group of contacting cords that bear on the wheel rim and form the bead.

When the cord is wrapped onto the spheroidal or spherical surface of the former it will be apparent that it lies in a geodesic line thereon, that is, a line so drawn upon the surface as to coincide with the position of a string stretched across the surface between two points in the line. The geodesic line is the shortest or longest line on the surface between any two points in it and its osculating plane, that is, one which has three or more coincident and successive points in common with the surface of the spherical former, and which is everywhere normal to the spherical surface. The osculating plane is that one in which the last of the guiding rollers 54 rotates. When the tire is shaped and molded and later subjected to tensions the cords may vary somewhat from a perfect geodesic line but will generally approximate it. In the finished tire adjacent points on the successive cords may shift slightly as the bead portions tend to draw inwardly, but the sheathing of rubber insures that these cords will not be in actual abrasive contact but separated by a thin mass of yieldable resilient rubber.

As described above, on inflation of the tire, the cord is tensioned and undergoes strain so introducing a change in the lattice pattern due to the varying angles of intersection. The effects of friction at the cross-over points of the cord and the bonding of the rubber on the cord in conjunction with the strain change in the lattice pattern cause a radially outward displacement of the cross-over points of the cord outside the bead arc so that unwinding takes place at each end of the bead arc, the unwinding increasing with increase of inflation pressure. This is accompanied by a tensioning of the ends of the arcuate portions of cord in the beads, which tend to straighten and move radially inward to grip an associated wheel rim. If at a particular pressure the angle of unwinding at each end of the bead arc exceeds half the value of the bead lap angle then the grip on the wheel rim will be lost. The reinforcement must therefore be such that this will not occur within the working pressure range.

Figure 11:
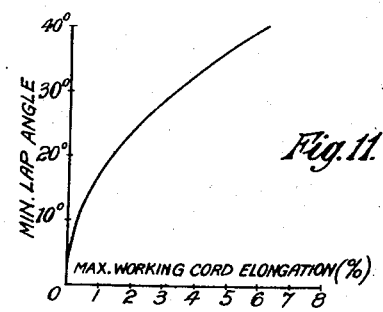
Figure 11 shows graphically for a particular tire the relation between cord elongation and minimum bead lap angle.

The theoretical minimum bead lap angle is largely dependent on the elongation characteristics of the cord employed as reinforcement for the tire. Figure 11 shows graphically the approximate relation between cord elongation and theoretical minimum bead lap angle in an aircraft tire having an outside diameter of 36" and a bead diameter of 16½".

In this figure the ordinate represents the theoretical minimum bead lap angle in degrees and the abscissa represents the percentage maximum working cord elongation. It will be seen that with such a tire and a cord having a maximum working elongation of 5% a theoretical minimum bead lap angle of the order of 36° is required to ensure a grip on the wheel rim. With cords having a lower elongation characteristic, e.g. steel wire, a smaller theoretical minimum bead lap angle is sufficient.

As indicated above, tires having a construction in accordance with the present invention have a number of desirable properties, one being that it is possible to dispense with the rigid metal bead wires used in the known types of tires, as the cord itself forms the beads. Further, on inflating the tire, the portions of the cords lying adjacent the edges of the tire move or tend to move radially inwardly to grip an associated rim. This result differs from that obtained on inflating a conventional pneumatic tire when the beads tend to move away from the rim. An advantage stemming from this result comprises a lesser tendency to tire creep relative to the rim, which makes practicable a reduction in the height of the rim flange for retaining the tire on the rim and a consequent reduction in the weight of the wheel. Since the improved tire need not be a tight fit on the rim when deflated, stripping and assembly of the tire off and on the rim is facilitated.

A further advantage of tires constructed in accordance with the present invention is that the absence of the conventional bead wires renders them more flexible and so facilitates fitting them to rims of the one-piece type, having flanges integral with the base which may itself be flat or contain a central well. This is of particular importance in tires for heavy commercial vehicles and aircraft which cannot normally be fitted to such rims on account of the rigidity of their beads. Tires of conventional construction have therefore to be fitted to two or three piece rims, which are not normally leakproof and, unless special measures are taken to make them so, tubeless tires cannot be used. Tires constructed in accordance with the present invention are capable of being fitted to the one-piece rim, which is leakproof, and can therefore be of tubeless construction.

Another advantage of such tire constructions which is particularly valuable in tubeless tires is that, on inflating the tire, the beads thereof, which are normally rubber-covered, are forced into fluid-tight engagement with the wheel rim.

The strength/weight ratio of a tire constructed in accordance with the present invention is high and since the normal bead wires are dispensed with the tire is light and flexible.

A further advantage of tires constructed in accordance with the present invention is that the winding of the cord on the former can be carried out automatically with very little attention from the operator who can readily supervise simultaneously a number of cord winding machines.

Having now described my invention, what I claim is:

1. A pneumatic tire comprising a body of an organic elastomer having beads to seat on the rim of a wheel, side walls and a tread, and a cord reinforcement embedded in said elastomer and comprising at least one double layer of coils of said cord in series progressing around the tire and in which the cord of one layer crosses the cord of the other layer to form a lattice and the cord of each coil consists of two diagonally opposite arcuate portions one in one bead and the other in the opposite bead and portions connecting said arcuate portions and extending tangentially from the arcuate portions through the side walls and tread of the tire in an approximately direct path from one arcuate portion to the other, whereby pressure of inflation on said tire tensions the cord of each coil to create a radially inward component tending to contract the bead portion of the tire uniformly on a wheel rim.

2. The tire of claim 1 in which the cords of successive coils are embedded individually in the elastomer.

3. The pneumatic tire of claim 1 in which the inner periphery of the tire is of a cylindrical curvature and the arcuate portions of the cord are a compact mass bearing immediately on this inner peripheral surface.

4. The pneumatic tire of claim 3 in which the cords of successive coils are separated by the elastomer composition in which they are embedded to permit shifting under tension without rubbing contact.

5. A method of making a pneumatic tire which comprises winding, on a spheroidal surface and between a pair of limit planes equi-distant from a plane through the center of said surface and normal to an axis thereof, a cord in a path extending in a plane intersecting said center and tangent to said limiting planes and through an arc on the intersection of said limit planes with said spheroidal surface and in successive, closely spaced coils to form at least one double layer of cords in which the bias of the cords of one layer is reverse to that of the other to form a lattice, covering said resulting structure with a layer of uncured elastomer composition, removing the resulting structure from the spheroidal surface and shaping it to an inwardly open, torous, tire form having beads, side walls and tread portions and curing it to a unitary structure.

6. The method of claim 5 in which said cord is wound onto said spheroidal surface to form successive coils while said spheroidal surface is rotated on its axis to space successive coils.

7. The method of claim 6 in which said spheroidal surface is spherical.

8. The method of claim 5 in which said cord is sheathed in unvulcanized rubber composition before being wound on said spheroidal surface and is wound under tension to form a matrix embedding said cord.

9. The method of claim 6 in which said spheroidal surface is covered with a layer of uncured elastomer composition between said limit planes prior to winding said coils thereon.

10. The method of claim 9 in which said cord is sheathed with uncured elastomer composition prior to winding on said spheroidal surface and is wound under tension to form a matrix in which said coils are independently embedded.

11. The method of claim 10 in which in molding said tire the beads are displaced toward each other and the side walls and tread are expanded radially outwardly so that the portions of the cord at the limit planes lie in arcs in the beads of the tire.

12. Apparatus for building a reinforced, pneumatic, elastomer tire which comprises a former having a forming surface of spheroidal curvature truncated at planes spaced equi-distant from the equator of said spheroidal surface, means for winding a cord on said spheroidal surface in a path lying in a plane intersecting the center of said spheroidal surface at an angle to the axis of said spheroidal surface to form coils extending over said spheroidal surface from one of said planes to the other and in a tangent arc at the intersection of said planes with said spheroidal surface and means for rotating said former on the axis of said spheroidal surface in synchronism with said winding and in speed relation thereto to displace said coils to form a lattice of two cord layers of opposite bias.

13. The apparatus of claim 12 in which said means for winding said cord comprises a cord guide rotatable about said former in the plane of the path of said cord wound on said spherical surface.

14. The apparatus of claim 13 comprising an arm carrying said cord guide and rotatable on an axis intersecting the axis of said former at the center of said spheroidal surface and gearing interconnecting said arm and the means for rotating said former.

15. The apparatus of claim 12 having means for uniformly tensioning the cord being wound on the former.

16. The apparatus of claim 12 having means for extruding uncured elastomer composition onto the cord before winding on said former.

17. The apparatus of claim 12 having a pair of frusto-conical cord guiding members one at each end of said spheroidal former surface the surfaces of which make obtuse angles with said spheroidal surfaces.

18. An uncured pneumatic tire carcass having a body of an uncured organic elastomer of truncated spheroidal form having circular bead edges of equal diameter and loops of cord embedded individually in said body of elastomer and extending in circumferential series about said body to form layers of cord, the cords of one layer extending at an angle to the median plane of the carcass transverse to the cords of an adjacent layer to form a lattice, each loop of cord extending in an arc through the bead portion of the carcass and extending across the carcass from an arc in one bead to the arc in the opposite bead and in a flat plane intersecting the surface of said carcass and oblique to the median plane of said carcass and tangential to said arcs.

19. The uncured pneumatic tire carcass of claim 18 in which the curvature of the carcass is spherical and in which the loops of cord are arcs of great circles in said spherical curvature.

References Cited in the file of this patent

UNITED STATES PATENTS

| Number | Name | Date |
|---|---|---|
| 573,536 | La Force | Apr. 16, 1895 |
| 924,571 | Palmer | June 8, 1909 |
| 1,294,330 | Carlisle | Feb. 11, 1919 |
| 1,862,492 | Mallory | June 6, 1932 |
| 2,352,055 | Witt | June 20, 1944 |
| 2,505,045 | Holcomb | Apr. 25, 1950 |
| 2,546,230 | Modigliani | Mar. 27, 1951 |
| 2,672,914 | Weigold et al. | Mar. 23, 1954 |
| 2,686,554 | Hinman | Aug. 17, 1954 |
| 2,692,005 | De Cloud | Oct. 19, 1954 |
| 2,700,998 | Wallace | Feb. 1, 1955 |

FOREIGN PATENTS

| Number | Country | Date |
|---|---|---|
| 237,669 | Great Britain | Aug. 6, 1925 |